Feb. 25, 1969  H. VORDERBRÜGGE  3,429,446
APPARATUS FOR FILTERING TREATING LIQUOR IN WET PROCESSING
MACHINES OF THE TEXTILE INDUSTRY
Filed May 4, 1966
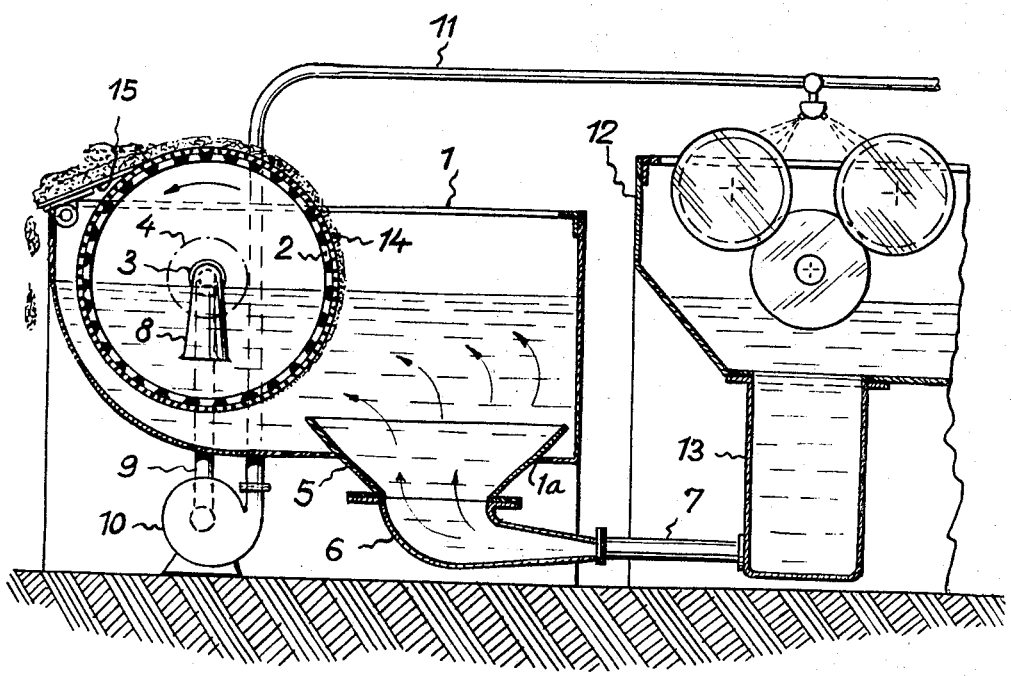
INVENTOR:
Hermann Vorderbrügge 3,429,446
APPARATUS FOR FILTERING TREATING LIQUOR IN WET PROCESSING MACHINES OF THE TEXTILE INDUSTRY
Hermann Vorderbrügge, Windelsbleiche, Germany, assignor to Joh. Kleinewefers Sohne, Krefeld, Germany
Filed May 4, 1966, Ser. No. 547,481
Claims priority, application Germany, May 19, 1965, K 56,155
U.S. Cl. 210—396
Int. Cl. B01d 33/06
3 Claims

ABSTRACT OF THE DISCLOSURE

Apparatus for filtering out impurities from liquids including a filter box adapted to receive the liquid, a screening drum mounted near one end of the box and a funnel shaped feeding means extending sealingly through an opening in the bottom wall of said box.

The present invention relates to an apparatus for purifying by filtering waste waters, especially of treating liquors and the like, of textile machines. Customarily, for instance with mercerizing machines, the purification of liquors is effected by centrifuges or by filters built into the return conduits. Filters of this type have various drawbacks. Thus, in view of the considerable soiling of the liquor to be purified, such impurifications including lint, pigments and gelatinous swaths, it is necessary to dimension the filters relatively large as a result of which they cannot be installed in the vicinity of the machines. This requires long pipe lines and pumping devices which, of course, are liable to get clogged up. Furthermore, the substances suspended in the liquor are beaten up by the pumps which prevents the agglomeration of such suspended substances, and finally the filters have to be cleaned rather frequently which in turn results in frequent work stoppages.

It is, therefore, an object of the present invention to provide an apparatus for filtering treatment liquors and the like in wet processing machines of the textile industry, which will overcome the above mentioned drawbacks.

It is a further object of this invention to provide an apparatus as set forth above, which will reduce the overall size of the filter and will permit the mounting of the apparatus adjacent or below the processing machine.

It is also an object of this invention to provide an apparatus as set forth above, in which the agglomerations will no longer be beaten up.

These and other objects and advantages of the invention will appear more clearly from the following specification in connection with the accompanying drawing diagrammatically illustrating an apparatus according to the present invention.

The apparatus according to the present invention is characterized primarily in that the filtering device while employing a rotary filter known per se is so designed and is in the vicinity of the wet processing machine so arranged that the liquor to be purified flows into the range of the screening drum at a laminary and highly reduced speed. In order to obtain the laminary flow, the filtering box is provided with a cone-shaped feeding box while also the feeding conduit may conically widen from the machine ahead of the connection to the feeding boxes.

In view of this design and arrangement of the filter, a number of advantages are obtained. The employment of a rotary filter reduces the overall size of the apparatus to such an extent that the apparatus can be arranged adjacent to or below the machine. The laminary feed of the liquor favors the reduced dimensions because the rotary filter will be used uniformly. In view of the laminary flow and the reduction in the speed, turbulence will be avoided, and the agglomeration of the substances will be aided whereby said substances in their turn will form a filter turbidity for the pectinous substances. In view of the elimination of the feeding pump, the agglomerations will no longer be beaten up. The laminary flow will produce a dynamic pressure which presses the impurities in the direction toward the screening drum. The filter cake which will build up on the screening surface increases the filtering effect so that the perforations of the drum can be relatively coarse and that fine filter gauze which has the tendency to clog up will not be required.

According to a further development of the present invention, the stripping device for the filter cake may be so designed that, regardless of whether it is actuated manually or automatically, it will feed the filter cake to a discharge worm with pressing means. The liquor which will be pressed out by the worm can in a free fall again be conveyed to the chambers ahead of the screening filter.

Referring more specifically to the drawing, the apparatus according to the present invention comprises a filter box 1 which, when viewed from the top, has a rectangular contour. Eccentrically arranged in said filter box 1 is a screening drum 2 of any standard design while the bearings 3 for the hollow drum shafts or studs are mounted on the longitudinal walls of the filter box. One shaft or stud may have a drive pulley or sprocket 4 mounted thereon. The bottom of filter box 1 may, for flow technical reasons, be curved adjacent to the screening drum 2. That bottom portion of the filter box which is not covered by the screening drum, in other words that bottom portion which, with regard to the drawing, is located on the right-hand side of drum 2, is provided with an opening 1a in which is sealingly inserted an upwardly flaring frusto-conically-shaped feeding box 5 the opening angle of which is approximately 90°. At the bottom side of said feeding box 5 there is connected to the latter a feed pipe 6 which is designed as a conical pipe because the conduits 7 of the machines to which the filtering apparatus is to be connected usually have a rather narrow cross section which produces a correspondingly highly turbulent flow. That end of the feed pipe 6 which is remote from the feeding box 5 is connected to conduit 7 which leads into the settling tank 13 of a wet processing machine, as for instance a mercerizing machine 12. The liquor purified by the screening drum 2 and collected in the interior of said drum is through a suction pipe 8 inside the drum and a pipe 9 conveyed to the suction side of a pump 10 and pumped by pump 10 into a distributing conduit 11 leading to the connected machine 12 or is conveyed to a storage tank.

The drawing illustrates how a filtering apparatus according to the invention may be arranged in front of or adjacent to a mercerizing machine and while cooperating therewith in a circuit has a communicating liquid level, which means that the liquid level in the filling box 1 is the same as that in the machine 12.

Inasmuch as the waste waters or residue waters of textile machines contain considerable amounts of lint, the filter cake deposited on the screening drum 2 has a felt-like character so that it can easily be scraped off the drum by the scraper 15. The scraped off filter cake is then conveyed to a dehydrating worm from which the squeezed off liquor returns to the filter box outside the screening drum.

It is, of course, to be understood that the present invention is, by no means, limited to the particular design and arrangement shown in the drawing but also comprises any modifications within the scope of the appended claims. Thus, the arrangement of the feed box may be different from that shown in the drawing. The feed box may, for instance, be arranged on the side of the flow technical effect with regard to the laminary feed of the suspended particles in the direction toward the screening drum will not be disturbed thereby.

What I claim is:

1. An apparatus for filtering out impurities from liquids, especially fibers and suspended particles from treating liquors and waste waters of wet processing machines for textiles, which includes: a filter box open at the top and adapted to receive the impurified liquid to be filtered, a horizontal shaft arranged in said filter box and near one end thereof, a screening drum rotatably journalled and mounted on said horizontal shaft, said screening drum having closed ends and a perforate peripheral portion and including means for withdrawing liquid from the interior thereof through at least one of said ends, said filter box having a bottom wall portion provided with an opening near the end opposite said one end of the filter box, funnel-shaped feeding box means extending sealingly through said opening in the vertical direction while flaring outwardly a substantial amount toward the interior of said filter box, and conduit means having one end in communication with said funnel-shaped feeding box means and having its other end arranged for communication with a collecting tank of a wet process machine for the supply of liquid to be filtered from said machine to said filter box, the cross section of said conduit means decreasing from that end thereof which is adjacent said funnel-shaped feeding box means to the other of said conduit means whereby liquid passing from said machine to said filter box will be substantially quiescent when it passes from said feeding box means into said filter box and thereby does not tend to disturb the material deposited on said drum.

2. An apparatus according to claim 1, in which said feeding box means has an included angle of about 90° between its side walls when viewed in vertical cross section.

3. An apparatus according to claim 1, which includes scraper means arranged adjacent the outer periphery of said screening drum near the top thereof for scraping off filter cake deposited on the drum and extending from said screening drum outwardly beyond the adjacent end of said filter box for the discharge of the scraped-off filter cake to a region outside said filter box.

References Cited

UNITED STATES PATENTS

| | | | |
|---|---|---|---|
| 898,212 | 9/1908 | Gaara et al. | 210—396 X |
| 2,076,611 | 4/1937 | Barnebl | 210—396 |
| 2,734,429 | 2/1956 | Cook | 210—402 X |
| 2,741,369 | 4/1956 | Fest | 210—402 X |
| 3,064,813 | 11/1962 | Smith | 210—402 X |

FOREIGN PATENTS

| | | |
|---|---|---|
| 950,724 | 10/1956 | Germany. |
| 81,743 | 10/1934 | Sweden. |

SAMIH N. ZAHARNA, *Primary Examiner.*

JOHN ADEE, *Assistant Examiner.*

U.S. Cl. X.R.

210—402, 456